United States Patent [19]

Ohsawa

[11] Patent Number: 5,969,817
[45] Date of Patent: Oct. 19, 1999

[54] PRECISION INDEXING ANGLE MEASURING METHOD AND SYSTEM FOR MACHINE TOOLS

[75] Inventor: Nobuyuki Ohsawa, Mitaka, Japan

[73] Assignee: Tokyo Seimitsu Co., Ltd., Japan

[21] Appl. No.: 08/911,088

[22] Filed: Aug. 14, 1997

[30] Foreign Application Priority Data

Aug. 27, 1996  [JP]  Japan .................................. 8-225458
Jul. 10, 1997  [JP]  Japan .................................. 9-185208

[51] Int. Cl.$^6$ ....................................................... G01B 9/02
[52] U.S. Cl. ................................................ 356/363; 356/361
[58] Field of Search ................................. 356/363, 361, 356/345

[56] References Cited

U.S. PATENT DOCUMENTS 5,237,390  8/1993  Chaney .................................... 356/349

FOREIGN PATENT DOCUMENTS

63-159706  10/1988  Japan .
2297841  8/1996  United Kingdom .
WO9631752  10/1996  WIPO .

*Primary Examiner*—Robert H. Kim
*Attorney, Agent, or Firm*—Christie, Parker & Hale, LLP

[57] ABSTRACT

Disclosed is an angle indexing precision measuring method and system capable of continuously measuring the precision in indexing the angle of a rotary table of a machine tool over 360°. One of a laser interference unit and dual corner cube unit which constitute a laser interferometer is fixed to a table, and the other one thereof is attached to a rotating mechanism which is fixed to a portion other than the table and whose axis of rotation is aligned with the axis of rotation of the table. Within a range of angles within which the relative angle reaches one limit of a range of set angles equal to or smaller than a range of measurable angles, a step of rotating the table by a unit angle and a step of measuring the relative angle are repeated. After the relative angle reaches one limit of the range of set angles, a step of rotating the rotating mechanism is carried out until the relative angle between the two parts reaches the other limit of the range of set angles. These steps are carried out over a whole range of angles.

6 Claims, 9 Drawing Sheets

PRECISION INDEXING ANGLE MEASURING METHOD AND SYSTEM FOR MACHINE TOOLS

BACKGROUND OF THE INVENTION

1. Field of the Invention

The present invention relates to a method and system for measuring the precision in the indexing angle of a table of a machine tool on which a workpiece or tool is placed. More particularly, this invention is concerned with a precision indexing angle measuring method and system for machine tools enabling measurement of the precision in an indexing angle within a range of 360° or more by utilizing a relative angle measurement apparatus capable of measuring a relative angle with high precision within a given range of measurable angles.

2. Description of the Related Art

A machine tool such as a machining center has a table on which a workpiece is placed. The table can be rotated. The machining center is designed to be large in scale and to operate with high precision. It is required to improve the precision in an indexing angle in the course of setting the table at a given angle. Some large-scale machining centers have an indexing angle resolution, that is, the ability to index an angle, in the order of several seconds. It is necessary to inspect the precision in indexing the angle of an actually-manufactured table, and it is therefore required to measure the angle of rotation of the table for an increment of angle equal to or shorter than the indexing angle resolution of the machine.

For measuring the precision in indexing the angle of a table, a method adopted in the past is such that, for example, a mirror is immobilized on the table; laser light is irradiated externally to the table; and the position of laser light reflected from the mirror is detected. For ready detection of the position of laser light, the laser light is scanned, and the position of the laser light is detected according to specific detection timing. By the way, the precision in indexing the angle of the table must be measured with a fine intervals over one turn, that is, 360° C. However, in the known method of detecting the position of laser light reflected from the mirror on the table, the interval is determined by a number of facets of the polygon mirror. For example, the interval is 60° C. when the number of the facets is six. The number of the facets must be increased in order to reduce the interval. However, this increases a cost of the polygon mirror. Namely, the known method using the polygon mirror has a problem that measurement cannot be carried out with a fine interval.

SUMMARY OF THE INVENTION

An object of the present invention is to provide a precision indexing angle measuring method capable of continuously measuring the precision in indexing the angle of a table over 360°, and a precision indexing angle measuring system capable of carrying out the measurement.

A precision indexing angle measuring method and system for machine tools in accordance with the present invention utilizes a relative angle measurement apparatus having two separate parts and capable of measuring a change in relative angle between the two parts over a given range of measurable angles. A rotating mechanism is mounted on an independent part that does not rotate together with the table of a machine tool so that the axis of rotation thereof nearly coincides with the axis of rotation of the table. One of the two parts of the relative angle measurement apparatus is fixed to the table, and the other part is attached to the rotating mechanism. Otherwise, the rotating mechanism is mounted so that the axis of rotation thereof nearly coincides with the axis of rotation of the table. One of the two parts of the relative angle measurement apparatus is fixed to the portion that does not rotate together with the table, and the other part is attached to the rotating mechanism. Thus, the two parts are set so that the relative angle between the two parts can be measured. After setting the two parts, rotating the table by a unit angle and measuring the relative angle between two parts are repeated until the relative angle between the two parts reaches one limit of a range of set angles smaller than the given range of measurable angles. When the relative angle between the two parts reaches one limit of the range of set angles, the rotating mechanism is used to rotate the other one of the two parts so that the relative angle between the two parts reaches the other limit of the range of set angles. These operations are carried out over the whole range of angles at which the precision in indexing an angle is measured.

In other words, according to the first aspect of the present invention, a precision indexing angle measuring method for machine tools utilizes a relative angle measurement apparatus having two separate parts and is capable of measuring a change in relative angle between the two parts over a given range of measurable angles and measures the precision in indexing the angle of a table of a machine tool on which a workpiece is placed. One of the two parts is fixed to the table, and the other part is attached to a rotating mechanism that is fixed to a portion of the machine tool independent of the rotation of the table and that rotates with the axis of rotation of the table as a center. The two parts are thus set so that the relative angle between them can be measured. Thereafter, a step of rotating the table by a unit angle and a step of measuring the relative angle between the two parts are repeated within a range of angles within which the relative angle between the two parts reaches one limit of a range of set angles smaller than the given range of measurable angles. After the relative angle between the two parts reaches one limit of the range of set angles, a step of rotating the other one of the two parts using the rotating mechanism is carried out until the relative angle between the two parts reaches the other limit of the range of set angles. These steps are carried out over the whole range of angles at which the precision in indexing an angle is measured.

According to the second aspect of the present invention, a precision indexing angle measuring method for machine tools is the same as that according to the first aspect except in that one of the parts of the relative angle measurement apparatus is fixed to the portion independent of the rotation of the table, the other part is attached to the rotating mechanism that is fixed to the table and rotates with the axis of rotation of the table as a center, and the two parts are set so that the relative angle between them can be measured.

According to the first aspect of the present invention, a precision indexing angle measuring system for machine tools is a measuring system for measuring the precision in indexing the angle of a table of a machine tool on which a workpiece is placed. The precision indexing angle measuring system comprises a relative angle measurement apparatus having two separate parts and is capable of measuring a change in relative angle between the two parts over a given range of measurable angles, a rotating mechanism that rotates with the axis of rotation of the table fixed to a portion of a machine tool independent of the rotation of the table, and a control unit for processing a value measured by the relative angle measurement apparatus and controlling the machine tool and rotating mechanism. In a state in which one of the two parts is fixed to the table, the other one thereof is attached to the rotating mechanism, and the two parts are set so that the relative angle between them can be measured, after the control unit controls the machine tool so as to rotate the table by a unit angle within a range of angles within which the relative angle between the two parts reaches one limit of a range of set angles equal to or smaller than the given range of measurable angles, the control unit repeats an operation of reading the relative angle between the two parts which is output from the relative angle measurement apparatus. After the relative angle between the two parts reaches one limit of the range of set angles, the control unit controls the rotating mechanism so as to rotate the other one of the two parts until the relative angle between the two parts reaches the other limit of the range of set angles. The control unit repeats these operations over a whole range of angles at which the precision in indexing an angle is measured.

According to the second aspect of the present invention, a precision indexing angle measuring system for machine tools is identical to that according to the first aspect except such a point that a rotating mechanism is fixed to the axis of rotation of the machine tool on the table and placed so that the rotating mechanism can rotate with the axis of rotation of the table as a center, one of two parts of the relative angle measurement apparatus is fixed to the portion independent of the rotation of the table, and the other part thereof is attached to the rotating mechanism.

As for the angle of rotation of the other one of the two parts, an encoder may be included in the angling mechanism and a value detected by the encoder may be adopted as the angle of rotation. Alternatively, the relative angle measurement apparatus may be used to detect the angle of rotation.

The relative angle measurement apparatus must be able to measure the relative angle at a small resolution, and should preferably be formed with a laser interferometer. An acceptable laser interferometer includes a laser interference unit and a dual corner cube unit having two corner tubes juxtaposed, and measures a change in difference between distances from the laser interference unit to the two corner cubes by detecting a change in interference fringes resulting from interference of laser light rays output from the laser interference unit and reflected from the two corner cubes. In this case, the laser interference unit is fixed to the table, and the dual corner cube unit is attached to the portion independent of the rotation of the table.

Furthermore, it is required that with the laser interference unit fixed to the table, the table can rotate. Besides, the laser interference unit should preferably be compact in size. The laser interferometer should be of a separation type in which a laser light source for supplying laser light to a laser interference unit, and a fringe counter for counting the number of changes in interference fringes of the resulted laser light are included separately from the laser interference unit, laser light is supplied from the laser light source to the laser interference unit over an optical fiber, and the resulted laser light is transmitted from the laser interference unit to the fringe counter over an optical fiber. This kind of separation type laser interferometer is disclosed in, for example, Japanese Utility Model Publication (Kokai) No. 63-159706.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Figure 1A:
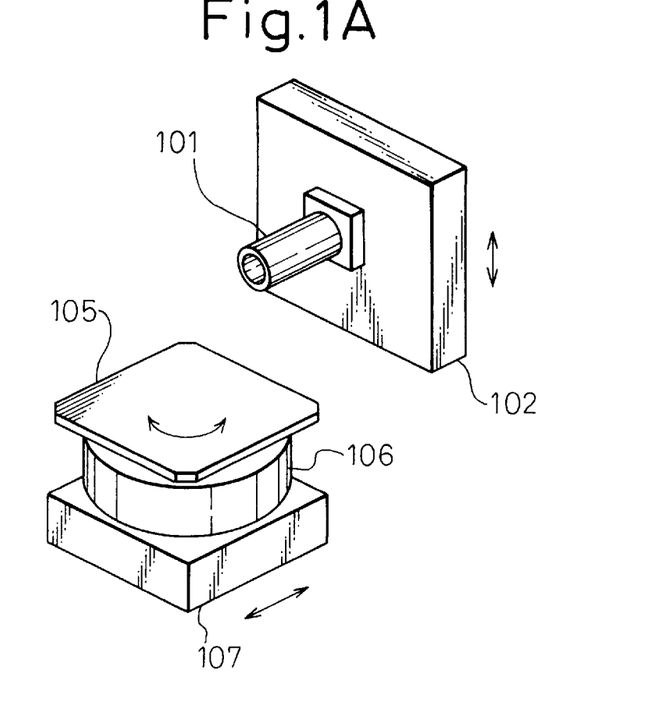
FIG. 1A is a diagram showing basic components including a work mounting table and moving mechanism of a machining center.
Figure 1B:
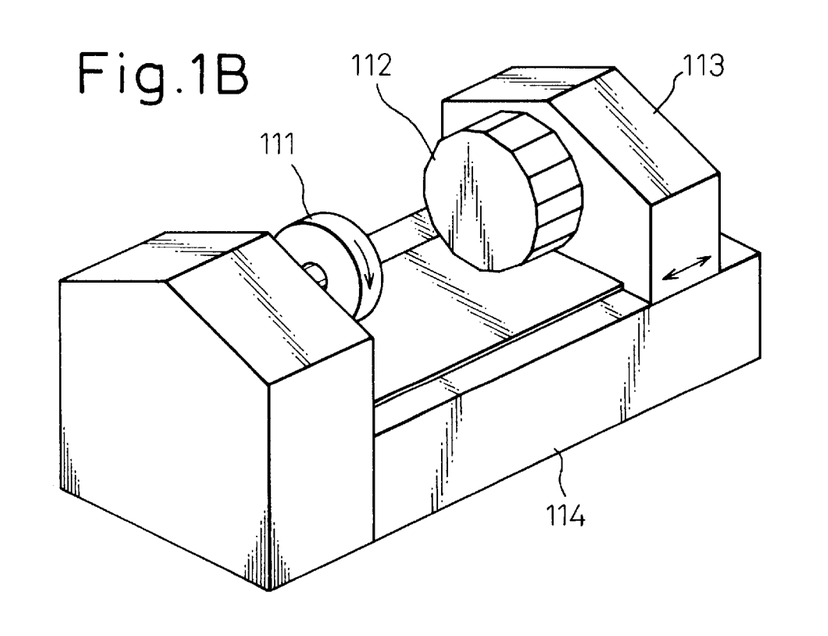
FIG. 1B is a diagram showing basic components including an axis of rotation of an NC turret lathe to which a workpiece is attached, a turret head, and mechanisms for moving them.

To begin with, a machine tool to which the present invention is adapted will be described. A machine tool such as a machining center has a table on which a workpiece is placed and which can rotate. FIG. 1A is a diagram showing basic components including the table of the machining center, an axis of rotation to which a tool is attached, and mechanisms for moving them. FIG. 1B is a diagram showing basic components including an axis of rotation of a numerical control (NC) turret lathe to which a workpiece is attached, a turret head, and mechanisms for moving them. In FIG. 1A, there are shown an axis of rotation 101 to which a tool is attached, a Z movement base 102 to which the axis of rotation is fixed and which moves in the Z-axis direction, a table 105, a mechanism for rotating the table 106, and a Y movement base 107 for moving the table 105 in the Y-axis direction. A moving mechanism for moving the Z movement base 102 in the X-axis direction is actually included but is omitted herein. In FIG. 1B, there are shown an axis of rotation 111 to which a workpiece is attached and rotated, and a turret head 112 having tools mounted on the surfaces thereof. The turret head 112 is fixed to a movement base 113 and can be rotated at a desired angle. Herein, what is referred to as a table includes the turret head. The description will proceed by taking a machining center as an example.

With a workpiece fixed to the table 105, a tool suitable for machining is attached to the axis of rotation 101. Machining is then carried out while a position to which the table 105 is rotated and the positions of the movement bases are set properly.

The machining center is designed to be large in scale and operate with high precision. It is required to improve the precision in indexing an angle in the course of setting the table 105 at a desired angle. In some large machining centers, the width of the table 105 is nearly 1 m, and the resolution for angle indexing is in the order of several seconds. A disk-like scale is used to detect the angle of the table of the machining center. As the width of the table 105 gets larger and the diameter of the scale gets larger, the resolution for angle indexing can be reduced. However, it is necessary to inspect the precision in indexing the angle of an actually-manufactured table. The present invention relates to a method and system for measuring the angle of rotation of a table for an increment of angle equal to or shorter than the indexing angle resolution of the machine.

Figure 2:
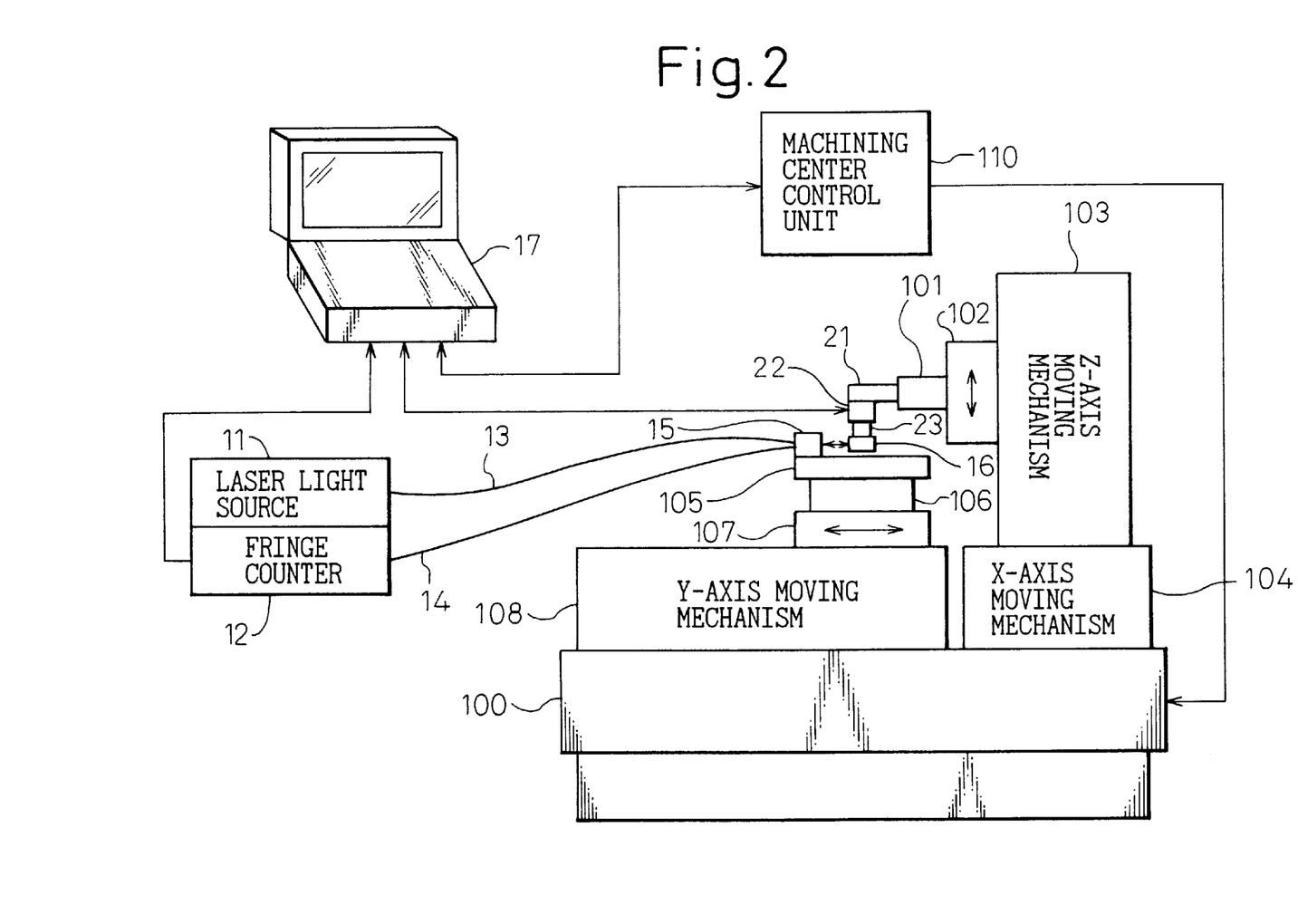
FIG. 2 is a diagram showing an overall configuration of the first embodiment of the present invention for measuring the precision in indexing the angle of a work mounting table of a machining center.

FIG. 2 is a diagram showing an overall configuration of a measuring system of the first embodiment of the present invention for measuring the precision in indexing the angle of a work mounting table of a machining center.

A machining center shown in FIG. 2 is the same as a known one. A main unit 100 comprises an X-axis moving mechanism 104, a Z-axis moving mechanism 103 movable in an X-axis direction by means of the X-axis moving mechanism 104, a Z direction movement base 102 that is moved in the Z-axis direction by means of the Z-axis moving mechanism 103, an axis of rotation 101, fixed to the Z direction movement base 102, to which a tool is attached, a Y-axis moving mechanism 108, a Y direction movement base 107 that is moved in the Y-axis direction by means of the Y-axis moving mechanism 108, a table rotating mechanism 106 placed on the Y direction movement base 107, a work mounting table 105 to be rotated by the table rotating mechanism 106, and a machining center control unit 110 for controlling the machining center.

In this embodiment, an optical fiber coupling type laser interferometer, having a laser light source, a laser interference unit, and a fringe counter separated from one another, is used to measure a relative angle. There are shown a laser light source 11, a fringe counter 12, a laser interference unit 15, an optical fiber 13 over which laser light is supplied from the laser light source 11 to the laser interference unit 15, a dual corner cube unit 16 having two corner cubes juxtaposed, a computer 17 for controlling the system, a rotating mechanism holding unit 21 fixed to the axis of rotation of the machining center, a rotating mechanism 22 fixed to the rotating mechanism holding unit 21, and a rotary encoder 23 for detecting a magnitude of rotation made by the rotating mechanism 22. The table 105 and rotating mechanism holding unit 21 are moved by the X-axis moving mechanism 104 and Y-axis moving mechanism 108 so that the axis of rotation of the table 105 substantially coincides with the center of rotation of the rotating mechanism 22. The dual corner cube unit 16 is attached to the rotating mechanism 22. The laser interference unit 15 is fixed to the work mounting table 105 and rotates together with the table. The computer 17 outputs signals, which are used to instruct the processing of reading the number of changes in fringes provided by the fringe counter 12 and calculating a change in relative angle between the laser interference unit 15 and dual corner cube unit 16, control of rotation of the rotating mechanism 22, rotation of the work mounting table 105 of the machining center, and movement of the moving mechanisms, to the machining center control unit 110.

The laser interferometer employed in this embodiment is a separation type laser interferometer described in Japanese Utility Model Publication (Kokai) No. 63-159706. The separation type laser interferometer is a laser interferometer in which the laser light source 11 and laser interference unit 15 are linked by the optical fiber 13 that is a single-mode fiber or plane-of-polarization retained fiber. The employment of the separation type laser interferometer obviates the necessity of aligning the laser light source 11 with the laser interference unit 15, and expands the freedom in arranging them. Moreover, the fringe counter 12 is provided with a photodetector, and light waves containing interference fringes are transmitted to the photodetector in the fringe counter 12 over the optical fiber 14. Consequently, the laser interference unit 15 can be designed compactly. The laser interference unit 15 is fixed to the work mounting table 105 of the machining center and rotates together with the rotation of the table. Since the optical fibers 13 and 14 have flexibility, the laser interference unit 15 can be rotated 360°.

The configuration of the separation type laser interferometer is described in the Japanese Utility Model Publication (Kokai) No. 63-159706 and a detailed description of the interferometer will be omitted. A method of measuring a relative angle using the laser interferometer will be described briefly.

Figure 3:
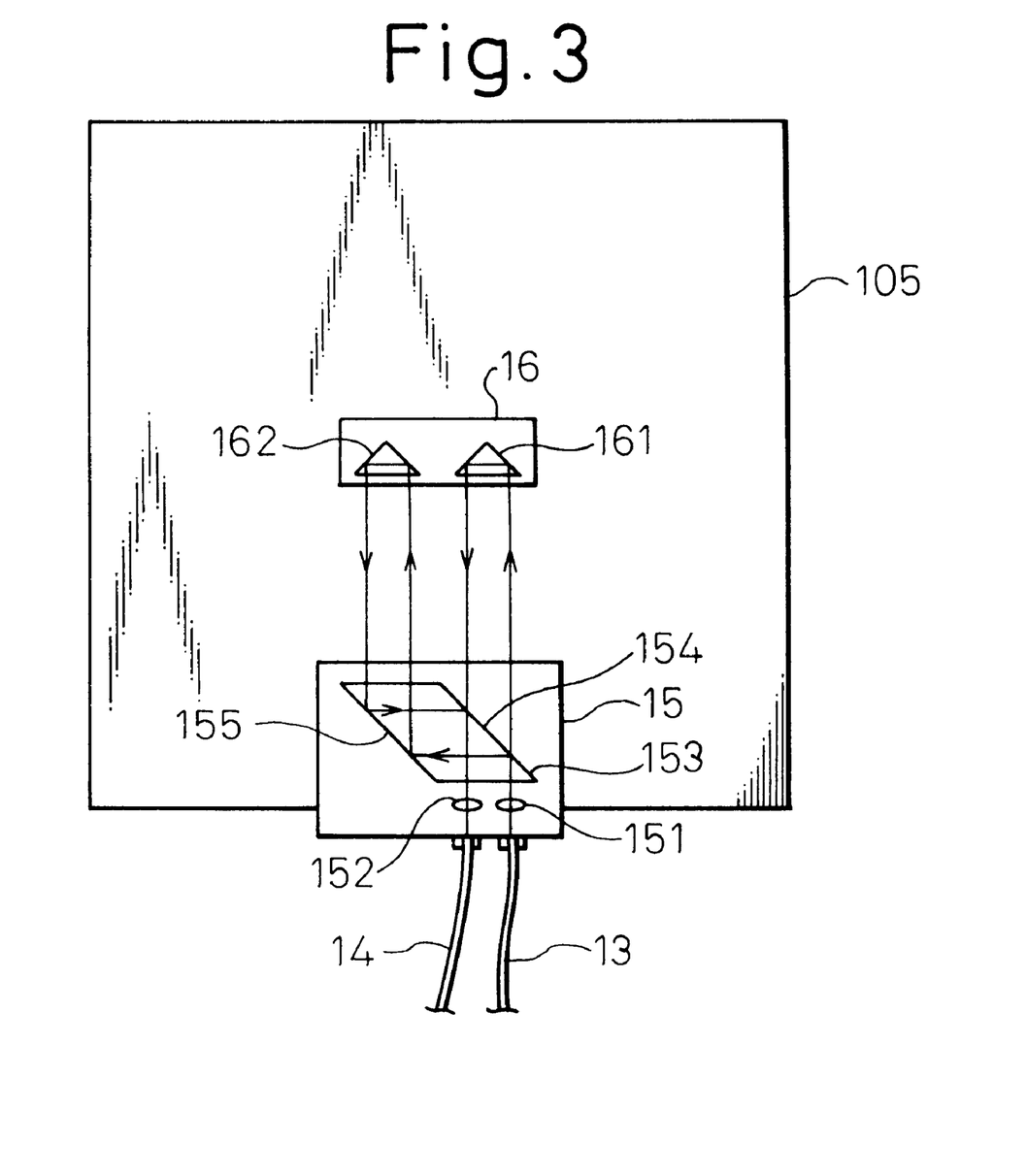
FIG. 3 is a diagram showing the arrangement of a dual corner cube unit and laser interference unit in the first embodiment.

FIG. 3 is a diagram of an outline arrangement of the laser interference unit 15 and dual corner cube unit 16 of a laser interferometer to be used to measure a relative angle. A quarter-wave plate or the like is included in practice but is omitted herein.

As shown in FIG. 3, the laser interference unit 15 includes a lens 151 for collimating laser light propagating over the optical fiber 13, a beam splitter 153, and a lens 152 for converging laser light rays, which interfere with each other, at an incident part of the optical fiber 14. The dual corner cube unit 16 has two corner cubes 161 and 162 juxtaposed. Laser light propagating over the optical fiber 13 is split into two portions by the surface 154 of the beam splitter 153. One of the portions falls on one corner cube 161, goes back in an opposite direction, and falls on the surface 154 of the beam splitter 153 again. The other portion of the laser light is reflected by the surface 155 of the beam splitter 153, falls on the corner cube 162, goes back in an opposite direction, is reflected by the surfaces 155 and 153 of the beam splitter 153 again, interferes with light reflected from the corner cube 161, falls on the optical fiber 14, and is then transmitted to the fringe counter 12. When the relative angle between the dual corner cube unit 16 and laser interference unit 15 changes, the lengths of an optical path along which light is reflected by the corner cube 161 and returns and of an optical path along which light is reflected by the corner cube 162 and returns vary. This causes the number of interference fringes to change. A change in relative angle can therefore be detected by detecting a change in number of interference fringes.

Figure 4A:
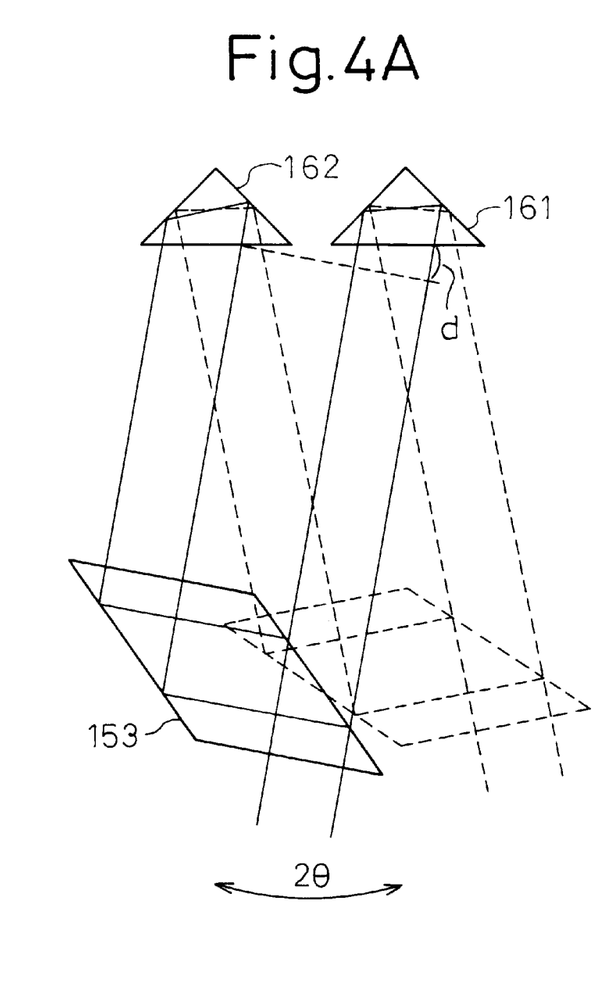
FIGS. 4A and 4B are diagrams for explaining the rotation of the dural corner cube unit and laser interference unit in the first embodiment.
Figure 4B:
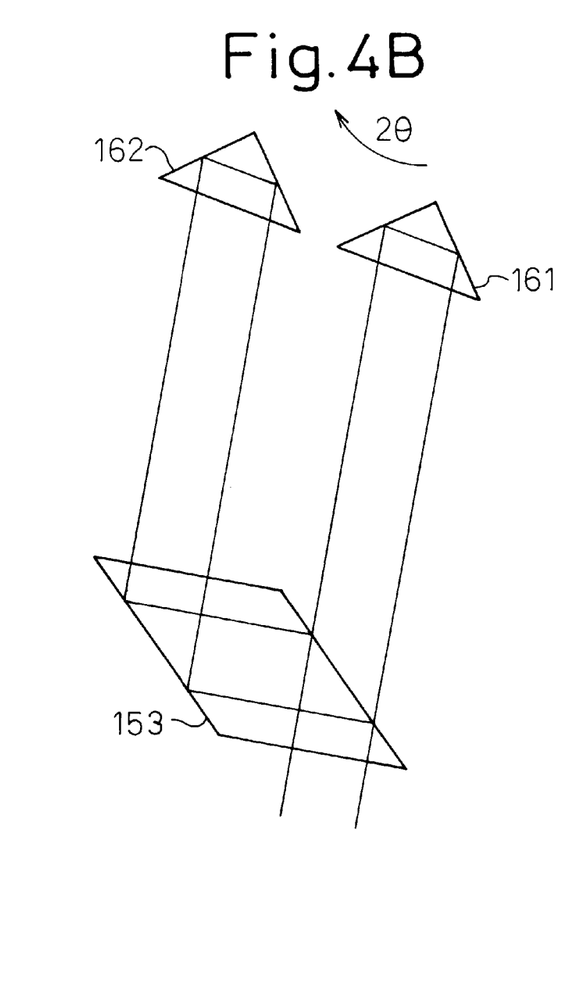

FIGS. 4A and 4B are diagrams for explaining a change in relative angle between the dual corner cube unit 16 and laser interference unit 15 which must be taken into consideration in measuring the precision in indexing the angle of a table. Assume that the dual corner cube unit 16 is kept in a state shown in FIG. 4A. The beam splitter 153 of the laser interference unit 15 is initially placed in a state indicated with a dashed line. With the rotation of the table, the beam splitter 153 rotates 2θ to enter a state indicated with a solid line. When the beam splitter 153 rotates to change from the state indicated with a dashed line to the state indicated with a solid line, the length of the optical path of laser light reflected by the corner cube unit 161 gets relatively larger. This causes interference fringes to change simply. As long as θ assumes a small value, the angle of rotation is proportional to a change in number of fringes, and can therefore be detected by detecting the change in interference fringes.

However, the range of angles, θ, within which the angle of rotation can be detected highly precisely is not very large.

When θ is equal to or larger than a certain angle, the angle of rotation cannot be measured. In this embodiment, therefore, when the state shown in FIG. 4A is attained, the rotation of the laser interference unit 15 is stopped. The rotating mechanism 22 causes the dual corner cube unit 16 to rotate by 2θ and to thus enter the state shown in FIG. 4B. The relative angle between the dual corner cube unit 16 and laser interference unit 15 in the state shown in FIG. 4B is identical to that in the state indicated with a dashed line in FIG. 4A. This means that the laser interference unit 15 can be rotated by 2θ and then a change in relative angle can be measured. By repeating this operation, a change in relative angle deriving from the rotation of the laser interference unit 15 can be measured continuously over an angle equal to or larger than 360°. The precision in indexing the angle of the table can therefore be measured.

The dual corner cube unit 16 must be rotated to the other limit of the range of the set angles, namely, −θ. In this embodiment, an encoder 23 is included for measuring the angle of rotation of the rotating mechanism 22. Using the encoder, the angle of rotation of the dual corner cube unit 16 is measured. When the dual corner cube unit 16 is rotated, the number of interference fringes changes in an opposite direction as described later. By detecting the change in number of interference fringes, the angle of rotation of the dual corner cube unit 16 may be measured.

Figure 5:
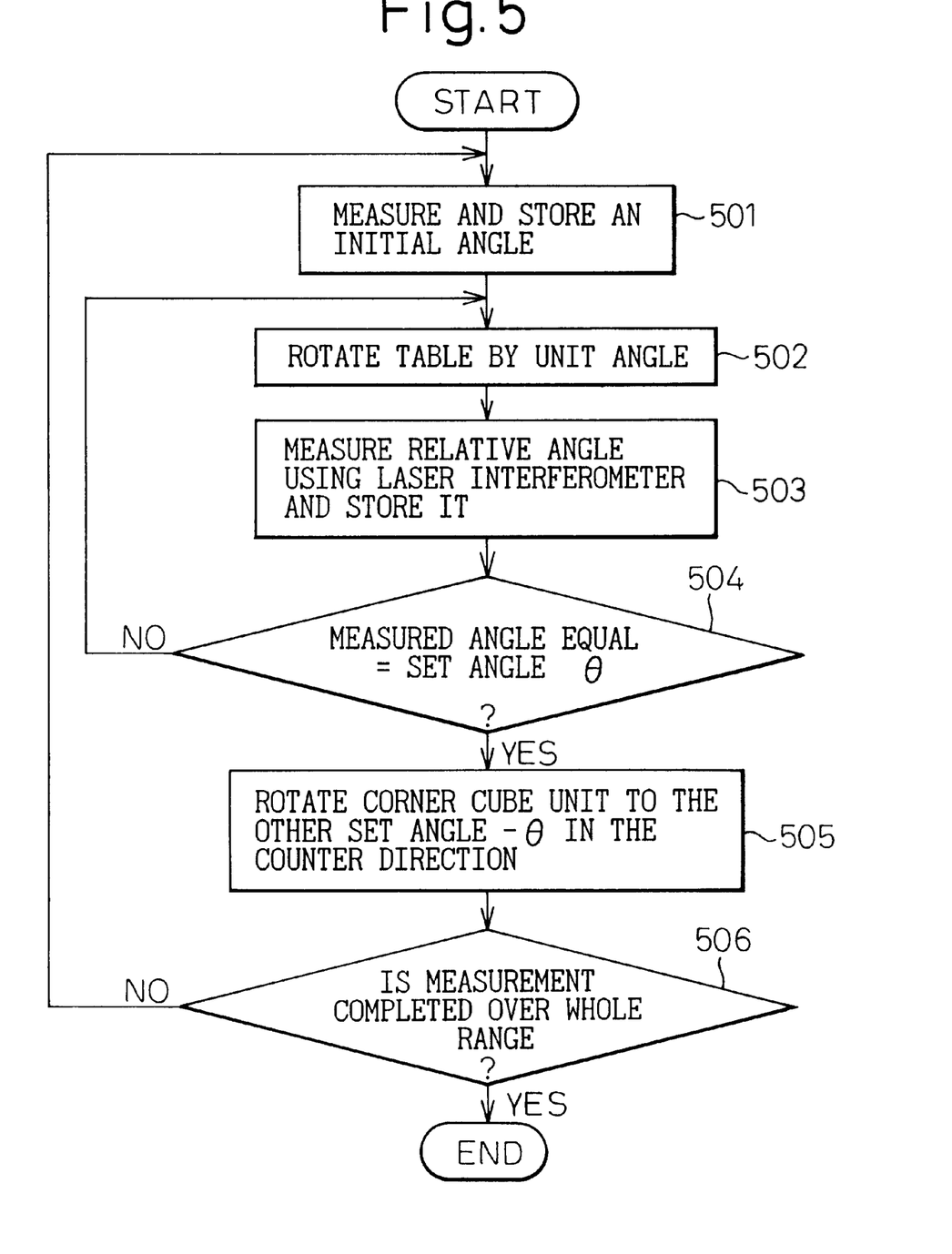
FIG. 5 is a flowchart describing a control operation in the first embodiment.

FIG. 5 is a flowchart describing measurement in this embodiment.

At step 501, an initial relative angle between the dual corner cube unit 16 and laser interference unit 15 at a starting state is measured and stored. At step 502, the table is rotated by a unit angle. The unit angle is a minimum unit by which the table is rotated. With the rotation, the laser interference unit 15 rotates. At step 503, a change in number of interference fringes deriving from the rotation is detected in order to measure a change in relative angle. The measured change in relative angle is then stored. At step 504, it is judged whether or not the measured angle equals to a set angle θ. The processing of steps 502 and 503 is repeated until the measured angle equals to the set angle θ. When the measured angle becomes equal to the set angle θ, at step 505, the rotating mechanism 22 is rotated in order to rotate the dual corner cube unit 16 in the counter direction until the relative angle becomes −θ. The encoder is used to measure the relative angle of the dual corner cube unit 16 in relation to the laser interference unit 15. The relative angle of the dual corner cube unit 16 in relation to the laser interference unit 15 thus agrees with −θ. At step 506, it is judged whether or not the relative angle is measured over a whole range of measurable angles, or herein, 360° or more. The processing of step 501 to 505 is repeated until the measurement is completed over the whole range of measurable angles.

In the first embodiment, the laser interference unit 15 is fixed to the table 105, and the dual corner cube unit 16 is attached to the rotating mechanism 22 held by a portion independent of the table 105. Alternatively, the dual corner cube unit may be fixed to the table, and the laser interference unit 15 may be attached to the rotating mechanism held by the portion independent of the table. The second embodiment adopts an alternate structure.

Figure 6:
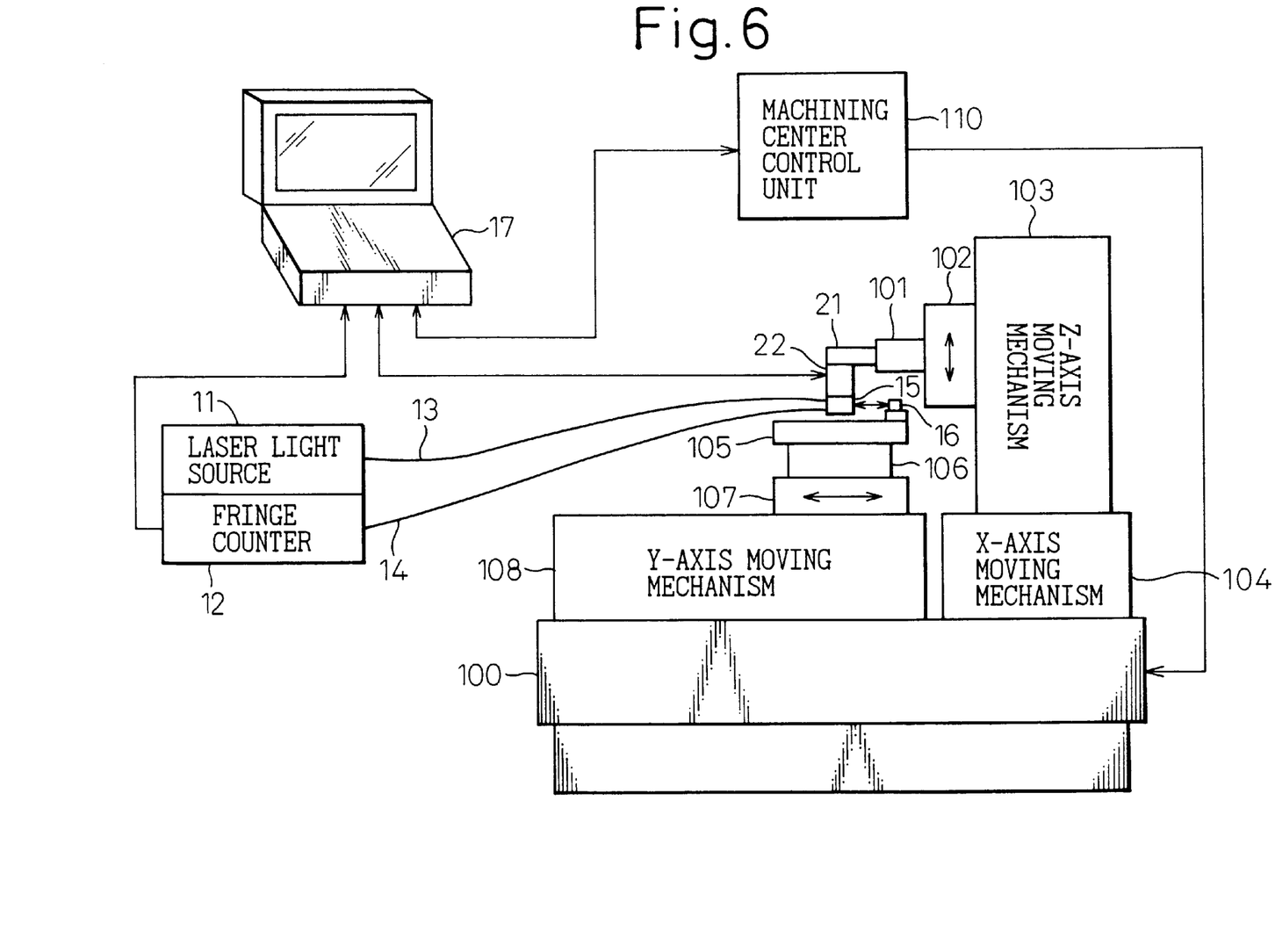
FIG. 6 is a diagram showing an overall configuration of the second embodiment of the present invention for measuring the precision in indexing the angle of a work mounting table of a machining center.

FIG. 6 is a diagram showing an overall configuration of a measuring system of the second embodiment of the present invention. The second embodiment is identical to the first embodiment except in the point that the laser interference unit 15 is attached directly to the rotating mechanism 22, and the dual corner cube unit 16 is fixed to a base on the table 105. The encoder 23 for detecting the angle of rotation of the rotating mechanism 22 is not included. Instead, the laser interferometer is used to detect the angle of rotation defined by the rotating mechanism 22.

Figure 7:
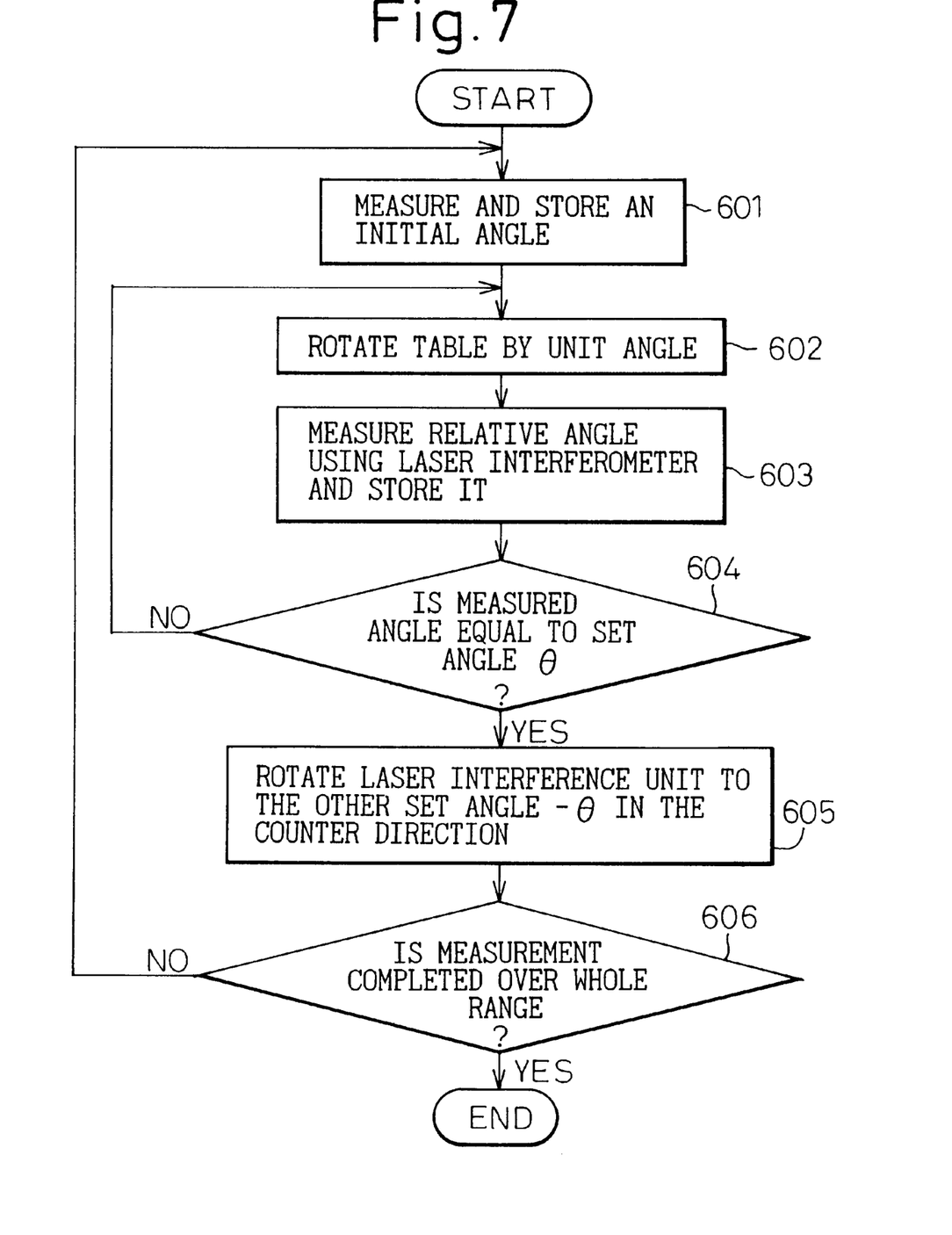
FIG. 7 is a flowchart describing a control operation in the second embodiment.

FIG. 7 is a flowchart describing measurement in the second embodiment. As is apparent from comparison with FIG. 5, a difference from the first embodiment lies in the point that since it is the laser interference unit 15 that is attached to the rotating mechanism 22, the laser interference unit 15 is rotated at step 605, and in a point that the rotating angle is measured using the laser interferometer. As described above, the measurement of the rotating angle by the laser interferometer is carried out by counting a change of the number of fringes of the interferenced light.

The axis of rotation of the rotating mechanism must substantially align with the axis of rotation of the table. In the first and second embodiments, the rotating mechanism is attached to the portion independent of the table so that the axis of rotation of the rotating mechanism aligns with the axis of rotation of the table. The laser interference unit or dual corner cube unit is fixed to the table. With the progress of measurement, the laser interference unit or dual corner cube unit rotates around the rotating mechanism. Alternatively, the rotating mechanism may be fixed to the table. The third embodiment adopts this alternate structure.

Figure 8:
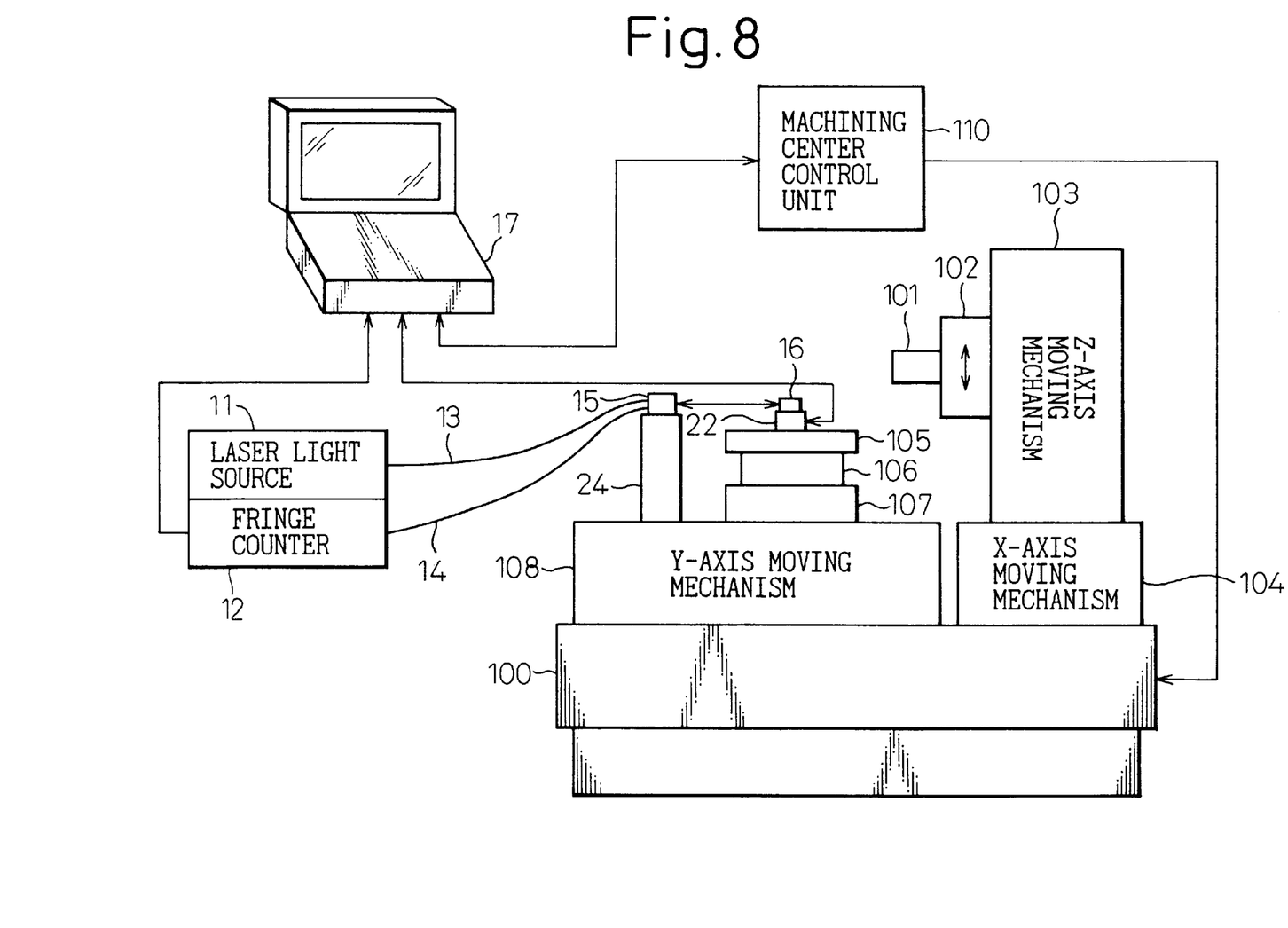
FIG. 8 is a diagram showing an overall configuration of the third embodiment of the present invention for measuring the precision in indexing the angle of a work mounting table of a machining center.

FIG. 8 is a diagram showing an overall configuration of a measuring system of the third embodiment. In the third embodiment, the rotating mechanism 22 is placed on the table 105 so that the axis of rotation thereof is aligned with the axis of rotation of the table 105. The dual corner cube unit 16 is attached to the rotating mechanism 22. The laser interference unit 15 is fixed to a base 24 placed on the Y-axis moving mechanism 108 independent of the table 105. Alternatively, the laser interference unit 15 may be attached to the rotating mechanism 22, and the dual corner cube unit 16 may be placed on the base 24.

Figure 9A:
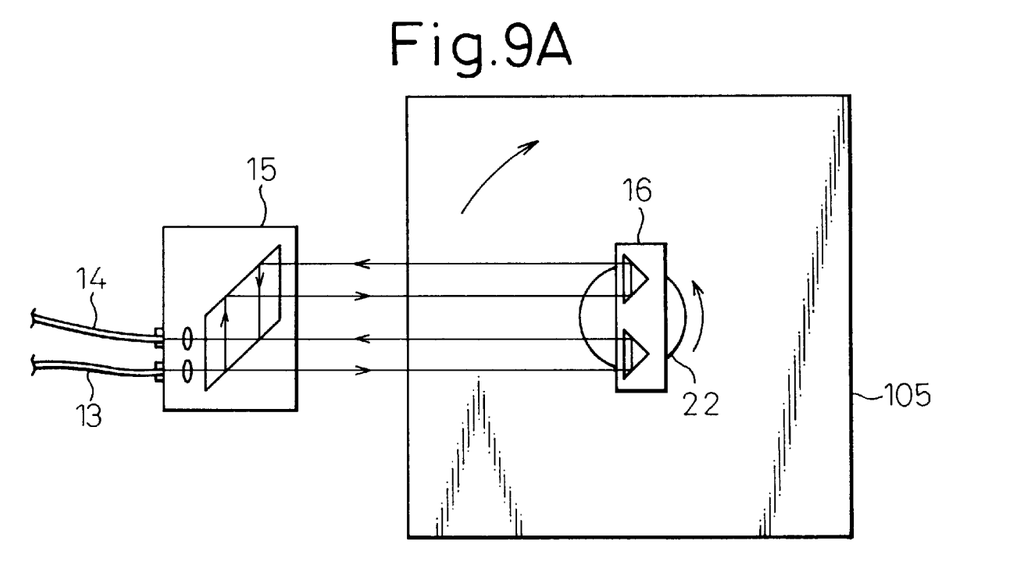
FIGS. 9A and 9B are diagrams for showing the arrangement of a dual corner cube unit and laser interference unit in the third embodiment.
Figure 9B:
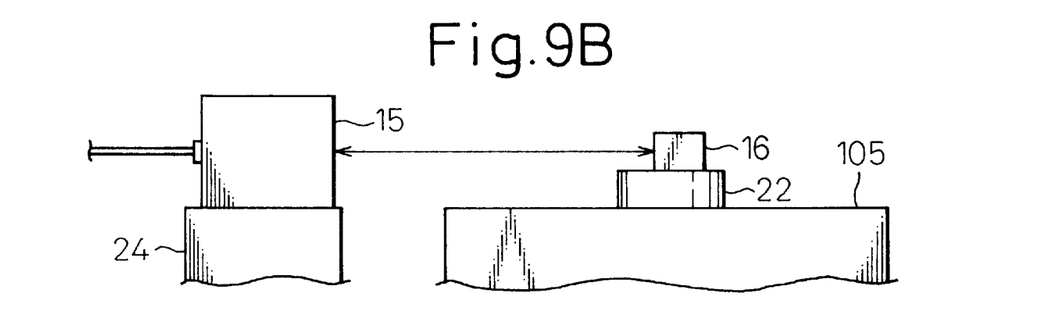

FIGS. 9A and 9B are diagrams showing the arrangement of the laser interference unit 15 and dual corner cube unit 16 in the third embodiment. Although the arrangement is different, since the dual corner cube unit 16 is attached to the rotating mechanism 22, measurement according to the third embodiment is identical to that described in FIG. 5. With the rotation of the table 101 made at step 502, the dual corner cube unit 16 rotates. At step 505, the dual corner cube unit 16 is rotated in an opposite direction by means of the rotating mechanism 22. This causes the angle of the dual corner cube unit 16 relative to the laser interference unit 15 to fall within a given range of angles all the time. Detecting the relative angle at step 505 is achieved by detecting a change in number of interference fringes produced by the laser interference unit 15 using the fringe counter 12. The other operations are identical to those in the first embodiment.

As described above, according to the present invention, the precision in indexing the angle of a work mounting table of a machine tool can be measured continuously and accurately over 360°. This enables drastic labor saving at the step of inspection.

What is claimed is:

1. A method of measuring the precision in indexing the angle of a table of a machine tool by utilizing a relative angle measurement apparatus that has two separate parts and can measure a change in relative angle between said two parts over a given range of measurable angles, said angle indexing precision measuring method for machine tools comprising:

fixing one of said two parts to said table, and attaching the other part to a rotating mechanism that is fixed to a portion of said machine tool independent of the rotation of said table and that rotates with the axis of rotation of said table as a center, and setting said two parts so that the relative angle between said two parts can be measured, within a range of angles within which the relative angle between said two parts reaches one limit of a range of set angles equal to or smaller than the given range of measurable angles, a step of rotating said table by a unit angle and a step of measuring the relative angle between said two parts are repeated;

after the relative angle between said two parts reaches one limit of the range of set angles, a step of rotating the other one of said two parts using said rotating mechanism is carried out until the relative angle between said two parts reaches the other limit of the range of set angles; and said steps are carried out over a whole range of angles at which the precision in indexing an angle is measured, wherein said two parts are a laser interference unit and a dual corner cube unit having two corner cubes juxtaposed, said relative angle measurement apparatus measures a change in relative angle between said laser interference unit and dual corner cube unit by detecting a change in interference fringes resulting from interference of laser light rays output from said laser interference unit and reflected from said two corner cubes, and wherein said relative angle measurement apparatus includes a laser light source for supplyinq laser light to said laser interference unit, a fringe counter for counting the number of changes in interference fringes, an optical fiber over which laser light is supplied from said laser light source to said laser interference unit, and an optical fiber over which the resulting laser light is transmitted from said laser interference unit to said fringe counter.

2. A method according to claim 1, wherein said rotating mechanism includes an encoder, and the angle of rotation of the other one of said two parts is detected by said encoder.

3. A method according to claim 1, wherein the angle of rotation of the other one of said two parts detected by said rotating mechanism is detected using said relative angle measurement apparatus.

4. A measuring system for measuring the precision in indexing the angle of a table of a machine tool, said angle indexing precision measuring system for machine tools comprising:

a relative angle measurement apparatus having two separate parts and capable of measuring a change in relative angle between said two parts over a given range of measurable angles;

a rotating mechanism that is fixed to a portion of said machine tool independent of the rotation of said table and rotates with the axis of rotation of said table as a center; and a control unit for processing a value measured by said relative angle measurement apparatus and controlling said machine tool and rotating mechanism, wherein in a state in which one of said two parts of said relative angle measurement apparatus is fixed to said table, the other part is attached to said rotating mechanism, and said two parts are set so that the relative angle between them can be measured, within a range of angles within which the relative angle between said two parts reaches one limit of a range of set angles equal to or smaller than the given range of measurable angles, said control unit repeats an operation of reading the relative angle between said two parts, which is output from said relative angle measurement apparatus, after rotating said table by a unit angle by controlling said machine tool;

after the relative angle between said two parts reaches one limit of the range of set angles, said control unit controls said rotating mechanism so as to rotate the other one of said two parts until the relative angle between said two parts reaches the other limit of the range of set angles; and said control unit carries out the above operations repeatedly over a whole range of angles at which the precision in indexing an angle is measured, wherein said two parts are a laser interference unit and a dual corner cube unit having two corner cubes juxtaposed, said relative angle measurement apparatus measures a change in relative angle between said laser interference unit and dual corner cube unit by detecting a change in interference fringes resulting from interference of laser light rays output from said laser interference unit and reflected from said two corner cubes after irradiated, wherein said relative angle measurement apparatus includes a laser light source for supplying laser light to said laser interference unit, a fringe counter for counting the number of changes in interference fringes, an optical fiber over which laser light is supplied from said laser light source to said laser interference unit, and an optical fiber over which the resulting laser light is transmitted from said laser interference unit to said fringe counter.

5. A system according to claim 4, wherein said rotating mechanism includes an encoder, and the angle of rotation of the other one of said two parts is detected by said encoder.

6. A system according to claim 4, wherein said control unit detects the angle of rotation of the other one of said two parts, which is defined by said rotating mechanism, on the basis of a value measured by said relative angle measurement apparatus.

* * * * *